United States Patent [19]
Ladney, Jr.

[11] 3,759,644
[45] Sept. 18, 1973

[54] MOLD FOR FORMING PLASTIC FOAM PARTS

[76] Inventor: Michael Ladney, Jr., 18125 E. Ten Mile Rd., East Detroit, Mich.

[22] Filed: Dec. 29, 1971

[21] Appl. No.: 213,298

[52] U.S. Cl.................. 425/129, 249/66 A, 249/83, 425/812
[51] Int. Cl............................................. B29f 1/10
[58] Field of Search................... 249/66, 66 A, 141, 249/112, 83, 91; 425/129, 812

[56] References Cited
UNITED STATES PATENTS

| | | | |
|---|---|---|---|
| 3,566,789 | 3/1971 | Hecht .............................. | 425/129 X |
| 3,247,550 | 4/1966 | Haines ........................ | 249/66 A UX |
| 3,055,058 | 9/1962 | Hartesveldt..................... | 425/812 X |
| 3,305,895 | 2/1967 | Ludwig........................... | 425/129 X |

Primary Examiner—H. A. Kilby, Jr.
Attorney—Arthur Raisch et al.

[57] ABSTRACT

A mold for forming plastic foam parts which has an improved arrangement for retaining within the molding cavity an insert onto which foam plastic is molded. A vacuum source communicates with the molding chamber through an inlet in the chamber wall. An insert is positioned over the vacuum inlet so that a continuous peripheral edge of the insert is sealingly interengaged on the wall, to thereby enseal vacuum between the insert and the chamber wall onto which the insert is positioned. The greater pressure outside of the ensealed vacuum acts on the insert to maintain the sealing interengagement of the insert edge with the chamber wall to thereby hold the insert in fixed position within the molding chamber.

7 Claims, 7 Drawing Figures

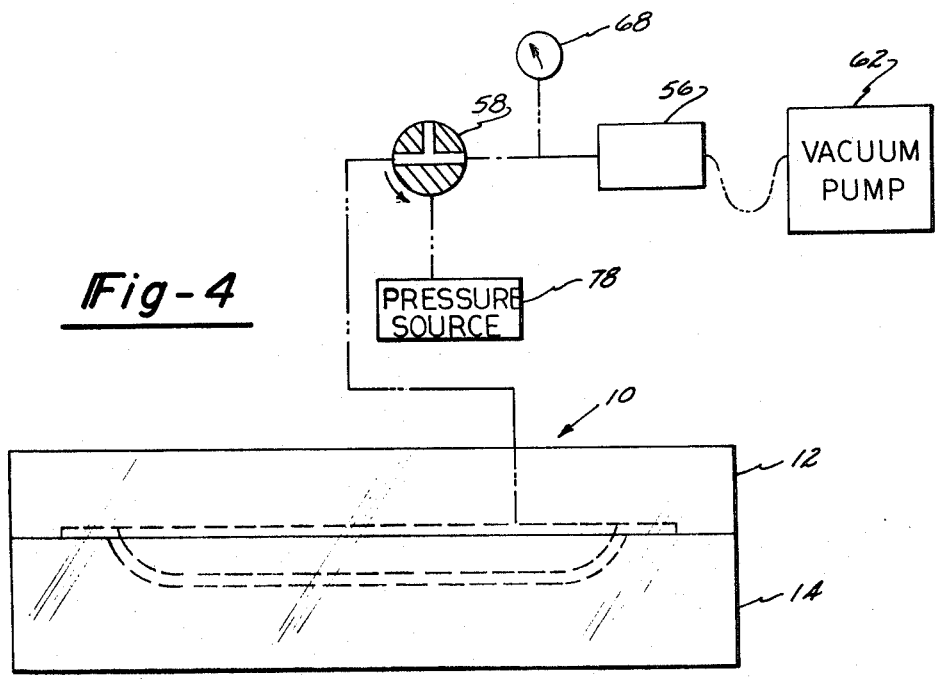
*Fig-4*
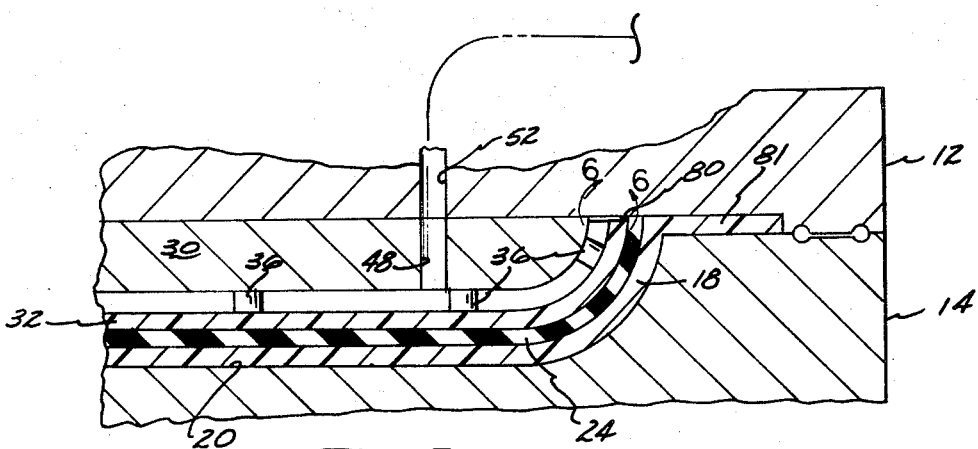
*Fig-5*
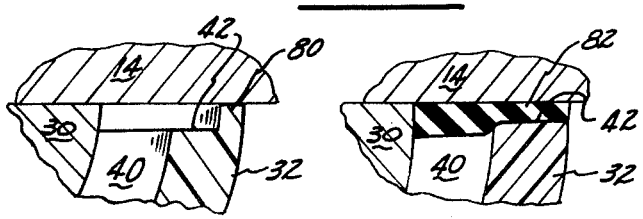
*Fig-6*     *Fig-7* the molding chamber wall. A continuous peripheral
MOLD FOR FORMING PLASTIC FOAM PARTS This invention relates to apparatus for molding foam plastic parts and in particular to an improved retention system for retaining within the molding cavity an insert onto which foam plastic is molded.

Metal and plastic inserts are utilized in foam plastic parts for various reasons such as to improve the rigidity of the part or to provide an attachment to other parts. When plastic foam is molded onto an insert, it is important to positively hold the insert in its intended position within the molding cavity so that it does not move during the molding process. In the past, means such as magnets and mechanical fasteners have been used to hold inserts within the molding cavity. For various reasons, these holding means are not universally satisfactory. For example, magnets are useful only when the insert is ferromagnetic and often lack sufficient holding force; such mechanical means as screws and clamps in many instances do not permit quick insertion and removal of the insert.

One of the objects of the present invention is to provide an improved means for retaining inserts within foam molding cavities. The improved retention means allows the bare insert to be readily loaded into the mold, then positively hold the insert in fixed location during the molding process and thereafter permits the foamed insert to be readily unloaded from the mold. Inserts of various types and shapes can be retained, and accordingly both metal and plastic inserts may be conveniently used. Not only does the improved retention means of the invention allow high production rates to be achieved with minimum scrap due to insert mislocation, but it also substantially reduces or entirely eliminates plastic flash around the periphery of the insert so that subsequent trimming is usually unnecessary.

Further advantages and objects of the invention will be seen in the following description and drawings wherein:

FIG. 4 is a schematic of another vacuum system which may be used with the mold.

FIG. 5 is a view similar to FIG. 3 showing a further embodiment of the invention.

FIG. 6 is an enlarged view taken in circle 6—6 of FIG. 5.

FIG. 7 is a view similar to FIG. 6 showing an additional embodiment.

The invention comtemplates a vacuum source communicated to the molding chamber via a vacuum inlet in the molding chamber wall. A continuous peripheral edge of the insert is sealingly interengaged on the wall of the molding chamber so that the insert cooperates with the portion of the chamber wall enclosed by the edge of the insert around the vacuum inlet to enseal vacuum therebetween. The greater pressure outside of the ensealed vacuum acts on the insert to maintain the sealing interengagement of the insert edge with the chamber wall to thereby hold the insert in fixed position within the molding chamber.

Figure 1:
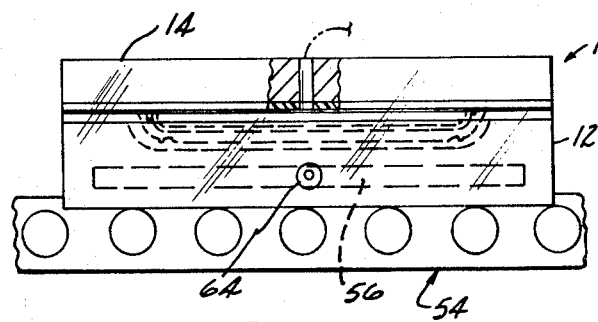
FIG. 1 is a front view, partly in section, of a foam mold which incorporates the improved retention arrangement of the invention and is taken substantially along line 1—1 as shown in FIG. 2.
Figure 2:
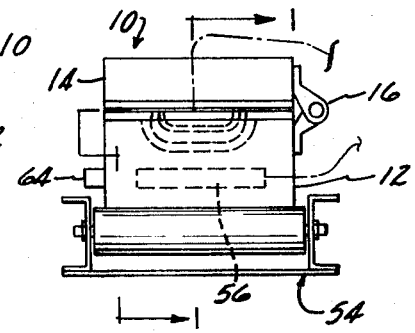
FIG. 2 is a right-hand end view of the mold of FIG. 1.
Figure 3:
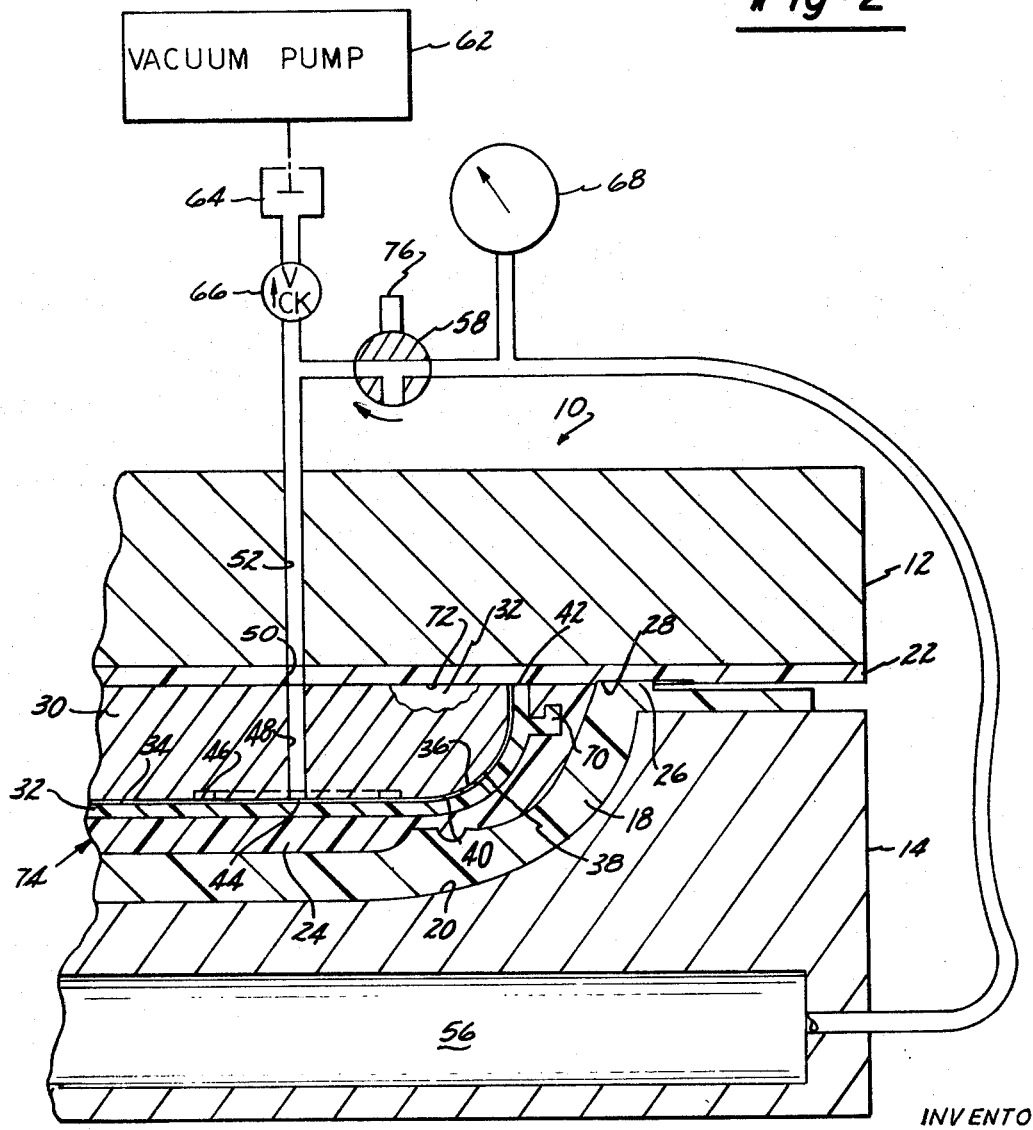
FIG. 3 is an enlarged fragmentary longitudinal sectional view through the mold of FIG. 1 taken in the same direction as the view of FIG. 1 and including a schematic of a vacuum system suitable for retaining an insert in the mold.

Turning now to the drawings and in particular to FIGS. 1, 2 and 3, a foam mold 10 comprises a lower half, or base, 12 and an upper half, or cover, 14 which are typically steel or aluminum. Cover 14 is shown in the closed position and is pivotally attached to base 12 by means of a hinge 16 (FIG. 2) to permit the cover to be swung upwardly from base 12 to an open position. A foam molding cavity forming member 18 is seated within a suitably shaped cavity 20 formed in base 12. A flat polyethylene sheet 22 is mounted on the flat lower surface of cover 14 to cooperate with molding cavity 18 in forming the foam molding chamber 24 of the mold. With cover 14 in the closed position, the sealing engagement of sheet 22 with molding cavity 18 is provided by the forcible engagement of a raised peripheral ridge, or bead, 26 which extends around the periphery of molding cavity 18 with a corresponding peripherally continuous recess 28 in sheet 22. The force which maintains this seal may be applied by a clamp or the like (not shown). A rigid core 30 is mounted on cover 14 by any suitable attaching means (not shown) and serves to locate an insert 32 within chamber 24. While a central portion of sheet 22 is sandwiched between core 30 and cover 14, such an arrangement is not critical to the invention; and therefore, the upper surface of core 30 could be mounted directly to the lower surface of cover 14 if desired. Preferably, core 30 is shaped to closely correspond to the contour of the inner concave wall 34 of insert 32. A plurality of spacers 36 are arranged on the surface 38 of core 30 to separate surface 34 of insert 32 from surface 38 of core 30. The layout and arrangement of spacers 36 on core 30 should provide a suitable means for accurately locating insert 32 on core 30 when the insert is positioned onto the core. The dimensions of core 30 and spacers 36 relative to the dimensions of insert 32 must be such that when insert 32 is positioned onto core 30, the upper peripheral edge surface 42 of insert 32 contacts sheet 22. Spacers 36 ensure the existence of a narrow free space 40 between insert 32 and core 30 over substantially the entire extent of the opposing surfaces 34 and 38. When vacuum is applied to free space 40, as hereinafter described, preparatory to foaming the insert, the greater pressure within the molding chamber forces surface 42 of insert 32 into sealing engagement with sheet 22. This arrangement permits insert 32 to be accurately located within the foam molding chamber and to be positively held in this location during the foaming process.

Turning now to the vacuum system for retaining the insert 32, vacuum is introduced into free space 40 via an inlet opening 44 in surface 38 of core 30. Preferably, a manifold 46, formed for example as a circular recess in surface 38, is also utilized. Manifold 46 is communicated with a passage 48 which extends through core 30 from opening 44. Vaccum is communicated to passage 48 through an aligned opening 50 in sheet 22 and an aligned passage 52 extending through cover 14. A vacuum source, such as a vacuum pump, may be connected directly to passage 52 to develop and maintain vacuum in free space 40. However, in the type of assembly wherein individual molds 10 are conveyed as on a conveyor 54 (FIGS. 1 and 2), it may be inconvenient to maintain a connection between the mold and the vacuum pump. For these types of molds, an individual vacuum reservoir is provided for each individual mold. Thus, in FIG. 3, a vacuum reservoir 56 is formed in base 12 and is connected to passage 52 through a control valve 58. In order to develop vacuum in reservoir 56 and in free space 40, a vacuum pump 62 may be connected to mold 10. Quick disconnect fitting 64 is connected through a check valve 66 to passage 52. With valve 58 in the position illustrated, vacuum pump 62 develops the desired vacuum in free space 40 and reservoir 56. When the requisite vacuum has been developed, as read on vacuum gauge 68, pump 62 may be disconnected at disconnect fitting 64. Check valve 66 prevents loss of vacuum, and therefore reservoir 56 maintains vacuum in free space 40. The vacuum system components may be mounted in any suitable fashion on mold 10. Preferably, disconnect fitting 64 is mounted on the front face of base 12 as shown in FIGS. 1 and 2 to provide convenient access for connecting vacuum source 62.

The usual sequence for loading the mold is as follows. With cover 14 in the open position, insert 32 is positioned onto core 30 with edge surface 42 engaging seal 22. Valve 58 is turned to the position illustrated and vacuum pump 62 is connected to quick disconnect 64. When the requisite vacuum is drawn as measured on gauge 68, the vacuum pump is disconnected. Insert 32 is now firmly retained on core 30. Cover 14 is then closed with plastic to be foamed being introduced into molding chamber 24 either by being poured into molding cavity 18 before cover 14 is closed or else by introducing it through an inlet arrangement (not shown) after the cover is closed. The foaming action of the plastic fills molding chamber 24 with plastic forming around insert 32, for example, around one or more projections 70 of insert 32.

Two advantages of the retention arrangement of the invention can now be appreciated. First, because insert 32 is peripherally sealed around its peripheral edge 42 by sealing engagement thereof with sheet 22, foam flash is prevented from intruding over edge 42 and into free space 40. Thus, the need for any subsequent trimming of foam flash is greatly reduced or practically eliminated. The second advantage is that undesirable voids or pockets in the foam as it forms in the vicinity of surface 42 can be eliminated. Generally, the locations of such voids are found during initial tryout of the mold and may be eliminated in production parts by forming a very small venting passage 72 in edge 42 of inserts 32 at the problem area. Passage 72 extends across the width of edge 42 between chamber 24 and free space 40 to communicate the problem area with vacuum. Now the gases generated during the foaming process can escape through passage 72 to vacuum to eliminate the pressure buildup which would prevent proper formation of the foam plastic. Passage 72 is sufficiently small to prevent both excess foam from intruding therethrough into free space 40 and excessive vacuum loss.

After the foam has cured to form the finished foam part 74 in molding chamber 24, vacuum must be removed from free space 40 to permit part removal. One way in which this may be done is by rotating valve 58 in the direction of the arrow to first block off reservoir 56 and then vent free space 40 to atmosphere via vent 76. Part 74 may then be removed. A new insert may be loaded, valve 58 returned to its intial position and vacuum source 62 connected to disconnect fitting 64 to mount the next insert to be foamed.

FIG. 4 shows an alternate arrangement for removing the foamed plastic part wherein like components are indicated by like reference numerals. With this type of vacuum system, the part is forcibly ejected from core 30 by turning valve 58 to connect a pressure source 78 to free space 40 instead of to vent the free space to atmosphere.

FIGS. 5 and 6 illustrate a further embodiment of the invention wherein similar parts are designated by like numerals. Instead of using polyethylene sheet 22 on cover 14, a lip seal 80 is provided on edge surface 42 of a plastic insert 32 when the insert is applied to core 30. Lip 80 contacts the bare metal of cover 14. When vacuum is now applied to free space 40, lip 80 forms the seal between insert 32 and cover 14. In this type of mold, the underside of cover 14 is preferably sprayed with a suitable release agent to permit the foamed part to be removed without tearing the foam after the vacuum in free space 40 is dissipated. Sealing engagement of cavity 18 is provided by engagement of outturned lip 81 with the bare metal of cover 14.

A further embodiment is shown in FIG. 7 wherein a sealing gasket 82 is mounted on cover 14 around core 30. A gasket constructed of silicone rubber provides excellent sealing characteristics for both metal and plastic inserts. Preferably, the outer edge of the gasket is flush with the outer surface of insert 32 to prevent foam from intruding over edge surface 42.

It is to be appreciated that any suitable arrangement for sealing a continuous peripheral edge of an insert to the wall of the molding chamber may be used provided that it is substantially leakproof. Thus, the lip seal described in FIG. 5 is suitable for use so long as it can be closely matched with cover 14. For inserts whose peripheral edge is subject to greater dimensional variation, the use of a compressible sealing gasket is preferred. It is also to be appreciated that depending upon the strength of the vacuum and the rigidity of the insert, it may be unnecessary to use a core with a plurality of spacers to retain the insert and that a recess could be provided directly in the cover to locate the insert as well as to form a sealing engagement therewith.

I claim:

1. A mold for forming a foam plastic part having a dish-shaped insert embedded therein with the convex face of the insert completely surrounded by the foam plastic comprising, a pair of separable upper and lower mold sections which when closed define a cavity therebetween having a seal around its outer periphery formed by engaged mating edge portions of the two mold sections, said upper mold section having a downwardly facing sealing surface in said cavity located laterally inwardly of said first-mentioned seal, said insert being disposed in said cavity with its concave surface facing upwardly, said insert having its upper outer peripheral edge conforming in contour to and engaging said downwardly facing sealing surface of the upper mold section, the portion of said insert spaced laterally inwardly from said peripheral edge thereof being generally spaced from said upper mold section to form an air space between the insert and the upper mold section except at said peripheral outer edge of the insert, the peripheral outer edge of said insert being spaced laterally inwardly of said seal and the insert also being spaced above the cavity-forming surface of the lower mold section to provide a foam molding chamber which extends around the peripheral edge of the insert and underlies the lower face thereof, a source of vacuum and means forming a communication between said vacuum source and said space between the upper mold section and the insert whereby the lower pressure in said last-mentioned space causes the outer peripheral edge of the insert to forcibly engage and seal with said sealing surface of the upper mold section so that plastic foam molding material can be introduced into said foam molding chamber to completely cover the underside, convex face of the insert.

2. A mold as called for in claim 1 wherein at least a portion of said outer peripheral edge of said insert is disposed at the uppermost portion of said foam molding chamber and means forming a bleed passageway between said portion of said outer peripheral edge of the insert and the mating portion of the upper mold section, said bleed passageway extending between the uppermost portion of the foam molding chamber and said air space for bleeding off gases in the foam molding chamber which tend to rise through the foam material therein during molding thereof.

3. A mold as called for in claim 2 wherein said bleed passageway is formed as a recess in said outer peripheral edge portion of said insert.

4. A mold as called for in claim 1 including conveyor means on which said mold is supported for advancing the mold in a predetermined path, said vacuum source being fixed relative to the conveyor structure so that the mold travels past the vacuum source as it moves along said path on said conveyor, said vacuum communicating means comprising a conduit extending from said vacuum source to said mold, said conduit having a disconnect coupling therein associated with a check valve to enable a mold to be disconnected from said vacuum source while maintaining a vacuum in said air space, a vacuum reservoir movable with said mold on said conveyor and communicating with said air space so that, when said air space is evacuated, the reservoir is also evacuated and, when said mold is disconnected from said vacuum source, said air space remains in communication with said vacuum reservoir.

5. A mold as called for in claim 4 wherein said vacuum communication means includes a conduit extending from the disconnect coupling to said air space and a branch conduit extending from said first-mentioned conduit to said reservoir.

6. A mold as called for in claim 5 including valve means on said mold for venting said air space to atmosphere.

7. A mold as called for in claim 4 wherein said vacuum reservoir has a volumetric capacity greater than said air space.

* * * * *